(12) United States Patent
Nemeth et al.

(10) Patent No.: US 7,871,741 B2
(45) Date of Patent: Jan. 18, 2011

(54) METHOD OF PRODUCING DIFFRACTIVE STRUCTURES IN SECURITY DOCUMENTS

(75) Inventors: Joshua Robert Nemeth, Elwood (AU);
Gary Fairless Power, Greenvale (AU);
Robert Stewart, Wigton (GB)

(73) Assignee: Securency International Pty Ltd, Craigieburn, Victoria (AU)

( * ) Notice: Subject to any disclaimer, the term of this patent is extended or adjusted under 35 U.S.C. 154(b) by 783 days.

(21) Appl. No.: 11/632,516

(22) PCT Filed: Jul. 15, 2005

(86) PCT No.: PCT/AU2005/001041

§ 371 (c)(1),
(2), (4) Date: Jul. 26, 2007

(87) PCT Pub. No.: WO2006/007635

PCT Pub. Date: Jan. 26, 2006

(65) Prior Publication Data

US 2007/0278785 A1 Dec. 6, 2007

(30) Foreign Application Priority Data

Jul. 16, 2004 (AU) ............................. 2004903948

(51) Int. Cl.
*G03H 1/04* (2006.01)
*B24D 15/10* (2006.01)
(52) U.S. Cl. .............................. 430/1; 430/2; 430/321; 430/945; 359/3
(58) Field of Classification Search ........................ None
See application file for complete search history.

(56) References Cited

U.S. PATENT DOCUMENTS 3,588,439 A * 6/1971 Heller et al. ........... 219/121.68

(Continued)

FOREIGN PATENT DOCUMENTS

DE 19713218 * 10/1998

(Continued)

OTHER PUBLICATIONS

Bartolini et al. "Embossed hologram motion pictures for television playback", Appl. Opt., vol. 9(10) pp. 2283-2290 (Oct. 1970).*

(Continued)

*Primary Examiner*—Martin J Angebranndt
(74) *Attorney, Agent, or Firm*—Andrus, Sceales, Starke & Sawall, LLP

(57) ABSTRACT

A method of producing a security document or article including a substrate (100), which is transparent at least to visible light, and a diffractive optical microstructure (112). The method includes applying an opacifying layer (102) to at least one surface of the transparent substrate (100). An area of the opacifying layer (102) is exposed to laser radiation (108) to ablate apertures (110) in selected portions of the opacifying layer (102), thereby forming a diffractive optical microstructure (112) on the surface of the substrate (100). The laser radiation may be patterned prior to exposing the opacifying layer (102), for example by passing the radiation through a mask (104). Alternatively, a focussed or collimated laser beam (206) may be directed onto the selected portions of the opacifying layer (102). Laser radiation may be directed onto the opacifying layer (102) either directly, or through the transparent substrate (100). Security documents or articles made in accordance with the method are also provided.

45 Claims, 2 Drawing Sheets

U.S. PATENT DOCUMENTS

| | | | |
|---|---|---|---|
| 3,869,301 A * | 3/1975 | Decker et al. | 430/2 |
| 5,379,698 A * | 1/1995 | Nowak et al. | 101/454 |
| 6,505,779 B1 | 1/2003 | Power et al. | |
| 2003/0010830 A1* | 1/2003 | Curtis | 235/491 |
| 2003/0127525 A1* | 7/2003 | Stromberg | 235/492 |
| 2005/0248817 A1* | 11/2005 | Weaver et al. | 359/2 |

FOREIGN PATENT DOCUMENTS

| | | |
|---|---|---|
| EP | 1310838 A1 | 5/2003 |
| JP | 05-040936 * | 2/1993 |
| JP | 10-319221 * | 12/1998 |
| WO | WO 98/36913 A1 | 8/1998 |
| WO | WO 01/00418 A1 | 1/2001 |
| WO | WO 01/53113 A1 | 7/2001 |

OTHER PUBLICATIONS

Vainos et al. "Excimer laser use for microethcing compuer generated holographic structurers", Appl. Opt., vol. 35(32) pp. 6304-6317 (Nov. 1996).*

International Search Report for parent application PCT/NO2005/000217, having a mailing date of Aug. 26, 2005.

Derwent Abstract Accession No. 2000-228568/20, V07, JP 2000047556 A (Dainippon Printing Co. Ltd.) Feb. 18, 2000.

Derwent Abstract Accession No. 2000-228567/20, V07, JP 2000047555 A (Dainippon Printing Co. Ltd.) Feb. 18, 2000.

Derwent Abstract Accession No. 2003-009148/01, JP 2002321476 A (Toppan Moore KK) Nov. 5, 2002.

Derwent Abstract Accession No. 40101 E/20, JP 57-058251 A (Tokyo Shibaura Elec. Ltd.) Apr. 7, 1982.

* cited by examiner

METHOD OF PRODUCING DIFFRACTIVE STRUCTURES IN SECURITY DOCUMENTS

FIELD OF THE INVENTION

The present invention relates generally to a method of producing a security document or similar article, and in particular to security documents or other articles which include an optically diffractive structure, such as a diffraction grating.

BACKGROUND OF THE INVENTION

It is known to apply diffraction gratings and similar optically detectable microstructures to security documents or similar articles, such as identity cards, passports, credit cards, bank notes, cheques and the like. Such microstructures have the advantages of being difficult to falsify or modify, and being easily destroyed or damaged by any attempts made to tamper with the document. Accordingly, such optically detectable structures may be used to provide an effective security feature.

One common method of applying diffraction gratings and similar structures to security documents involves the use of multilayer thin films. The thin film devices are typically supported on carrier structures during production, and then transferred from the carrier substrate to the security document or other article, typically by using a hot stamping process.

Thin film diffractive structures may be employed usefully as security features on documents or other articles. However, they have a number of associated disadvantages, including the complex and highly specialised production process required, the requirement for an additional process step to transfer the thin film structure to the security document, and a relatively high susceptibility to physical wear and tear and/or chemical attack.

In order to mitigate these problems, one known alternative method of producing optically detectable structured devices involves the exposure of a substrate to laser radiation. According to this method, the substrate is transparent to visible light, but absorbs light at the wavelength of the laser, such that the exposure of the substrate results in ablation of the surface to form a three dimensional optically diffractive structure thereon.

Following ablation, the surface may be coated with a reflective film, to produce a diffractive optical structure that is visible in reflection through the transparent substrate. Alternatively, the surface may be left uncoated, or be coated with a transparent coating having a different refractive index to that of the substrate. According to this method, a diffractive optical element can be formed that is visible in transmission through the document, when illuminated using a point light source, such as a visible laser, projected onto a suitable viewing surface.

While this latter method of producing a diffractive optical element in a security document mitigates many of the problems inherent in the use of multilayer thin films, it is not applicable where it is desired to coat or laminate the transparent substrate with a protective layer of transparent material having a similar refractive index to that of the substrate. Lamination of the security document by protective layers is generally required for products such as passports and identity cards, while for non laminated products, such as bank notes, it is desirable to apply a protective varnish to the optically detectable microstructure. However, since the diffraction effect relies on a change in refractive index across the interface of the microstructure, the application of a protective layer of similar refractive index, and which generally fills the structure, is destructive of the diffractive effect.

Accordingly, it is desirable to provide a method of producing a diffractive optical microstructure in a security document or similar article that retains the diffractive effect even when covered and filled by a protective laminate or coating of similar refractive index.

Any discussion of documents, devices, acts or knowledge in this specification is included to explain the context of the invention. It should not be taken as an admission that any of the material formed part of the prior art base or the common general knowledge in the relevant art on or before the priority date of the claims appended hereto.

SUMMARY OF THE INVENTION

In one aspect, the present invention provides a method of producing a security document or article including a substrate transparent at least to visible light and a diffractive optical microstructure, including the steps of:

applying an opacifying layer to at least one surface of the transparent substrate; and exposing an area of the opacifying layer to laser radiation to ablate apertures in selected portions of the opacifying layer and thereby to form a diffractive optical microstructure on said surface of the substrate.

A diffractive optical microstructure formed in accordance with the invention relies upon the effect produced when collimated light, eg from a point light source or a laser, that is incident upon the structure passes through, and is diffracted by, the ablated portions formed in the opacifying layer. An interference pattern may thereby be generated that produces an image that is visible when projected onto a suitable viewing surface or when the diffractive optical microstructure is viewed in transmission using a point light source.

The present invention is particularly applicable to the formation of diffractive microstructures known as numerical-type diffractive optical elements (DOEs). The simplest numerical-type DOEs rely on the mapping of complex data that reconstruct in the far field (or reconstruction plane) a two-dimensional intensity pattern. Thus when substantially collimated light, eg from a point light source or a laser, is incident upon the DOE, an interference pattern is generated that produces a projected image in the reconstruction plane that is visible when a suitable viewing surface is located in the reconstruction plane or when the DOE is viewed in transmission at the reconstruction plane. The transformation between the two planes can be approximated by a fast Fourier transform (FFT). Thus, complex data including amplitude and phase information has to be physically encoded in the microstructure of the DOE. This DOE data can be calculated by performing an inverse FFT transformation of the desired reconstruction (ie the desired intensity pattern in the far field).

Since the diffractive optical microstructure is formed through the contrast between the ablated portions and the adjacent opaque regions, it will not be destroyed even when coated by, or filled with, a coating or laminate having a similar refractive index to that of the substrate.

Furthermore, the image is not directly visible by inspection of the diffractive optical microstructure when viewed in reflection from the front or reverse side of the document. Accordingly, a diffractive optical microstructure formed in accordance with the invention exhibits the desirable property of previously known diffractive optical structures of being difficult to falsify or modify in an undetectable manner.

The step of exposing the opacifying layer to laser radiation may include irradiating the opacifying layer with a patterned laser beam bearing a pattern corresponding with the diffractive optical microstructure. A mask may be placed in the path of the laser radiation to create said patterned laser beam. Preferably, the mask has apertures formed therein such that the laser radiation passes through said apertures to form a patterned laser beam bearing the pattern of the desired diffractive structure.

Accordingly, a single mask may be provided for use in the production of security documents or similar articles that results in the rapid and repeatable generation of a fixed diffractive structure in the articles produced. The mask may be manufactured such that the diffractive structure generates any desired image, such as an image individual to, or distinctive of, a producer or issuer of a security document. The resulting diffractive structure may then be used, for example, to authenticate security documents originating from a particular source.

Alternatively, the step of exposing an area of the opacifying layer to laser radiation may include using a scribe laser, whereby a laser beam is directed onto the selected portions of the opacifying layer to form apertures in said portions by ablation.

The scribe laser may be computer controlled to produce individual diffractive structures which may be used, for example, to produce personalised documents wherein a unique structure may be used to authenticate a document as belonging to a particular individual. The image generated by the diffractive structure may be a biometric image, such as a photograph or fingerprint of an owner or authorised holder of a security document or other article.

It is preferred that the substrate be formed of at least one transparent plastics material, more preferably a transparent polymeric material, such as polyethylene (PE), polypropylene (PP) or polyethylene terephtalate (PET), which may be made up of at least one biaxially-oriented polymeric film. The substrate may include a single layer film of polymeric material, or alternatively may include a laminate of two or more layers of transparent polymeric film.

The opacifying layer is preferably a coloured or pigmented layer which may include any one or more of a variety of opacifying inks which can be used in the printing of security documents and similar articles. For example, the opacifying inks may include pigmented coatings that include a pigment, such as titanium dioxide, dispersed within a binder or carrier of heat activated cross-linkable polymeric material.

The opacifying layer is preferably a stronger absorber of laser radiation than the substrate. The wavelength of the laser radiation may be selected such that when the article is exposed to the radiation, the selected portions of the opacifying layers absorb the radiation and are ablated from the substrate, the substrate being substantially transparent to the radiation at the selected wavelength so that the laser radiation travels through the substrate without significant absorption. Accordingly, the opacifying layer may be ablated by the laser radiation without damage to the substrate.

The laser radiation may be a continuous beam. Alternatively, it may be emitted as a pulse or series of pulses.

In a preferred embodiment, the laser radiation is directed onto the opacifying layer from the side of the substrate opposed to the side upon which the opacifying layer is applied, such that the laser radiation passes through the substrate and ablates the selected portion of the opacifying layer.

In a particularly preferred embodiment, the substrate is formed of biaxially oriented polypropylene (BOPP), and the wavelength of the laser radiation used is approximately 248 nm.

The method may include the further step, after forming the diffractive optical microstructure, of applying additional layers to the transparent substrate to produce the finished security document or article. For example, a clear protective varnish may be applied that covers at least the diffractive optical microstructure. Alternatively or additionally, clear laminating layers may be applied to one or both sides of the substrate. Further transparent supporting layers may also be applied in order to produce the finished security document or other article.

In a second aspect, the present invention provides a security document or article including:

a substrate transparent at least to visible light; and a transmissive diffractive optical microstructure formed in an opacifying layer applied to at least one surface of the substrate by ablating apertures in selected portions of the opacifying layer by exposure to laser radiation.

According to a third aspect of the invention, there is provided a method of producing a security document or article including a substrate transparent at least to visible light and a diffractive optical microstructure, including the steps of:

applying an opacifying layer to a surface on one side of the substrate; and directing laser radiation onto said opacifying layer from the opposite side of the substrate;

wherein the substrate is substantially transparent to the laser radiation so that the laser radiation travels through the substrate without substantially affecting the substrate and selected portions of the opacifying layer are ablated by the laser radiation to form a diffractive optical microstructure in the opacifying layer.

In this aspect of the invention, the selected portions of the opacifying layer which are ablated by the laser radiation may not extend completely through the opacifying layer. In this manner, it is possible to form a reflective diffractive optical microstructure, eg a hologram, in the surface of the opacifying layer. However, because the microstructure is formed in the surface of the opacifying layer adjacent to the transparent substrate, the diffractive optical effects produced by the microstructure are substantially unaffected by subsequent application of a coating or laminate over the opacifying layer.

In a fourth aspect of the invention there is provided a security document or article including a diffractive optical microstructure made by the method of the third aspect.

BRIEF DESCRIPTION OF THE DRAWINGS

Further preferred features and advantages of the present invention will be apparent to those skilled in the art from the following description of preferred embodiments of the invention. It will be understood, however, that the preferred embodiments are not limiting of the scope of the invention as defined in any of the preceding statements. The preferred embodiments are described with reference to the accompanying drawings, in which.

DESCRIPTION OF PREFERRED EMBODIMENTS

Figure 1:
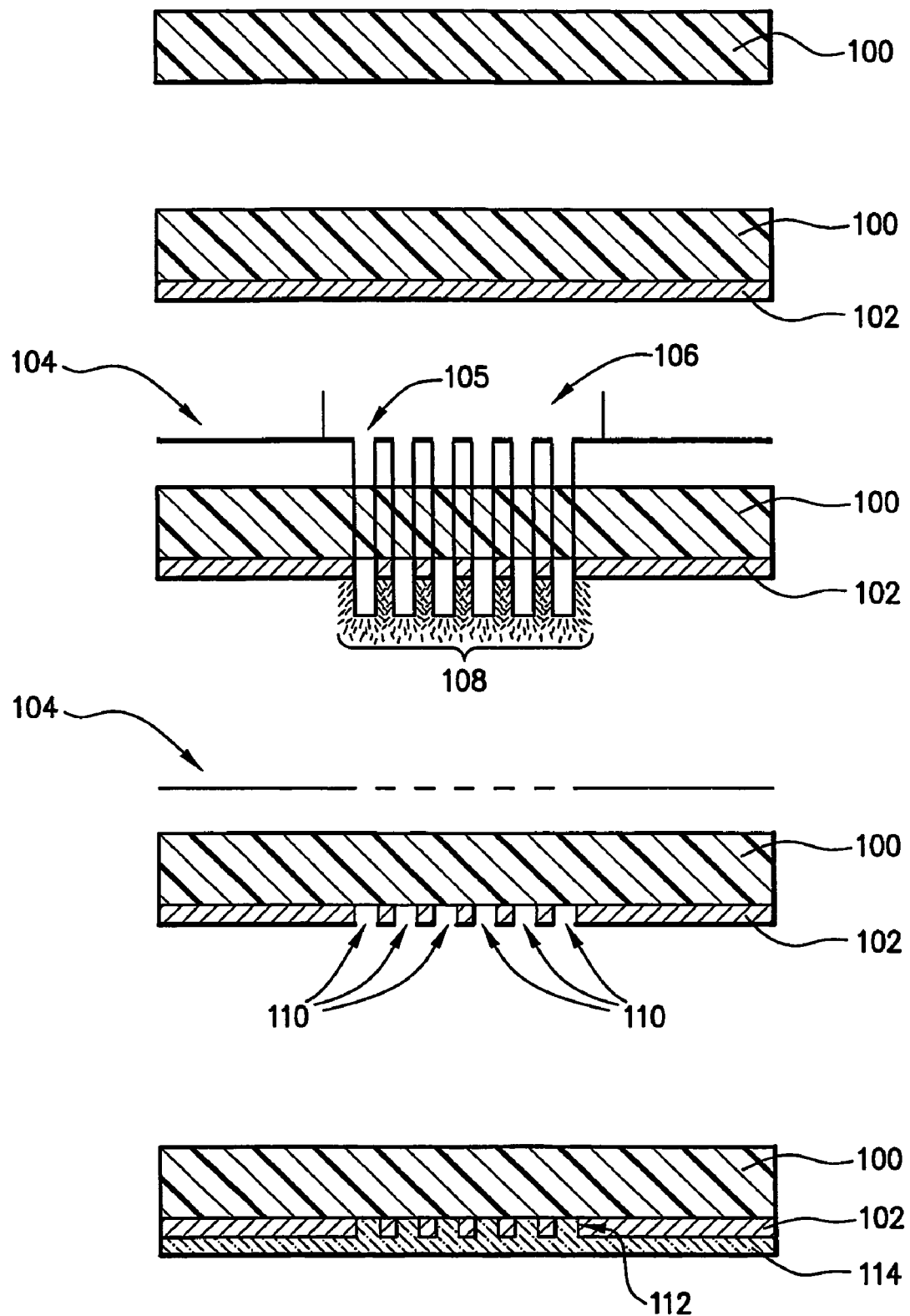
FIG. 1 is a schematic diagram illustrating steps involved in the method of producing a diffractive optical microstructure in a security document according to a first embodiment of the present invention.

Referring first to FIG. 1, there is shown a transparent plastics film 100 formed from polymeric material, used in the manufacture of a security document, or similar article, such as an identity card. The substrate 100 may be made from at least one biaxially oriented polymeric film. The substrate 100 may include or consist of a single layer of film of polymeric material, or, alternatively, a laminate of two or more layers of transparent biaxially oriented polymeric film. The substrate 100 is shown in cross section in FIG. 1.

An opacifying layer 102 is applied to one surface of substrate 100. The opacifying layer 102 may include any one or more of a variety of opacifying inks suitable for use in the printing of security documents formed from polymeric materials. For example, the layer of opacifying ink 102 may include pigmented coatings having a pigment, such as titanium dioxide, disbursed within a binder or carrier of heat activated cross-linkable polymeric material.

Laser radiation, in the form of laser beam 106, is then directed onto mask 104 that is interposed in the path of the laser radiation. Mask 104 has apertures, eg 105, through which the laser radiation passes. The passing of the laser radiation through the apertures of the mask 104 results in the formation of a patterned laser beam 108 which bears a pattern corresponding with the desired diffractive structure in accordance with the mask 104.

In accordance with the preferred embodiment of the invention illustrated in FIG. 1, the patterned laser beam 108 passes through transparent substrate 100 and irradiates opacifying layer 102. The wavelength of the laser radiation, and the polymeric material used to form substrate 100, are selected such that the substrate 100 is substantially transparent to the laser radiation. Accordingly, the patterned laser beam 108 is able to pass through substrate 100 with little or no absorption of the radiation, and therefore little or no heat build up and subsequent damage to the substrate, to impinge upon opacifying layer 102. In the preferred embodiment, the substrate is formed of biaxially oriented polypropylene (BOPP) and the wavelength of the laser radiation used is approximately 248 nm, derived from an excimer laser source.

The opacifying layer 102 is a relatively strong absorber of laser radiation at the selected wavelength, and therefore the patterned laser radiation is absorbed in opacifying layer 102, resulting in particles of opacifying layer 102 being ablated in accordance with the pattern of laser beam 108 to form apertures 110 in the opacifying layer.

The apertures 110 form a microstructure having optically diffractive properties. Visible light emitted from point source on one side of opacifying layer 102 will pass through apertures 110, but be blocked by the remaining, unablated, opacifying ink. A diffraction pattern will thus be formed in the transmitted light, which will form an image when projected onto a suitable screen or other viewing surface. The image formed is determined by the pattern of ablated portions 110, which is in turn determined by the pattern of apertures in mask 104. Accordingly, by forming an appropriate mask, a diffractive structure 112 may be created corresponding to any desired image. Use of the same mask will always result in the formation of a diffractive structure corresponding to the same projected image. The image may therefore be, for example, an image individual to, or distinctive of, a producer or issuer of a security document such as an identity card. The formation of diffractive structure 112 thereby provides a means to authenticate a document as originating from a particular source, such as an authorised issuer of identity cards.

Subsequent to forming the diffractive optical structure 112, a further protective layer 114 may be applied over the structure. The protective layer may be, for example, a protective varnish coating, or a further transparent laminate. The protective layer 114 will fill the ablated regions 110 in the opacifying layer 102, however since the diffractive optical structure 112 relies upon transmission of light through the ablated portions rather than on a change in refractive index, such filling of the ablated regions does not result in the destruction of the diffractive microstructure.

Figure 2:
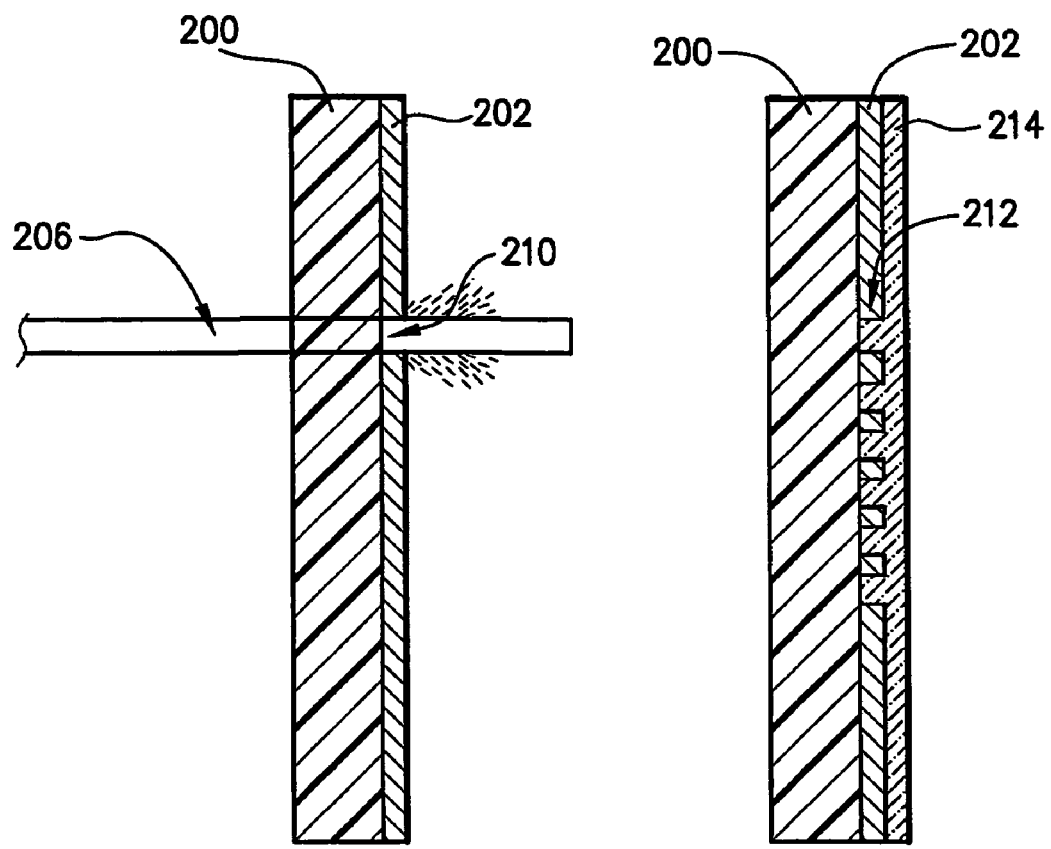
FIG. 2 is a schematic diagram illustrating steps involved in the method of producing a diffractive optical microstructure in a security document according to an alternative embodiment of the present invention.

Turning now to FIG. 2, there is shown an alternative embodiment of the invention, in which transparent plastics film 200 formed from polymeric material has been coated with opacifying layer 202. Focussed or collimated laser beam 206 is directed onto opacifying layer 202 through transparent substrate 200. By the same processes previously described with reference to FIG. 1, laser beam 206 passes through transparent substrate 200 and impinges upon opacifying layer 202 causing ablation of the opacifying layer to remove a selected portion 210.

Laser beam 206 is preferably emitted from a scribe laser (not shown), which may be controlled to inscribe any desired pattern of ablated regions in opacifying layer 202. Accordingly, the scribe laser may be controlled so as to produce any desired diffractive microstructure 212 in opacifying layer 202.

Through the use of a scribe laser, an individual diffractive structure 212 may be formed in opacifying layer 202. In accordance with this embodiment of the invention, therefore, personalised security documents, such as identification cards, may be produced that are unique to a particular individual. For example, laser beam 206 may be controlled so as to produce a diffractive structure 212 that generates a biometric image specific to a particular individual. The image may be, for example, a photograph or fingerprint of an owner or authorised holder of a security document, such as an identity card.

Again, a further protective layer 214 may be applied over the diffractive microstructure 212, filling the ablated regions, without destroying the diffractive properties of the structure.

Figure 3:
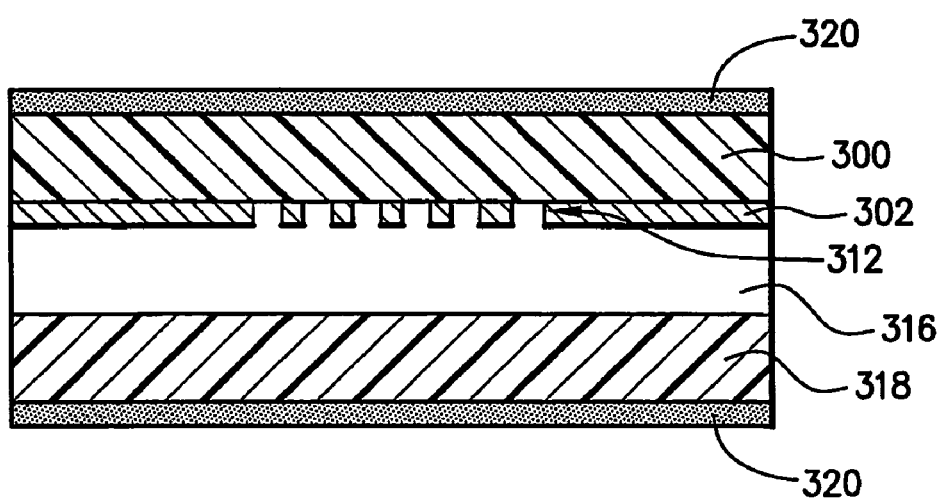
FIG. 3 is a schematic diagram illustrating a security document including a diffractive optical microstructure in accordance with an embodiment of the present invention.

FIG. 3 illustrates schematically, in cross-section, one embodiment of a completed security document made in accordance with the method of the invention. In producing the completed article, transparent substrate 300, preferably formed from biaxially oriented polypropylene (BOPP) is coated with opacifying layer 302, and diffractive microstructure 312 ablated from the opacifying layer in accordance with an embodiment of the method of the invention as described with reference to FIG. 1 or FIG. 2.

Once the optically diffractive structure 312 has been produced, further layers may be applied in order to complete the article. In the embodiment shown in FIG. 3, a further supporting layer 316 has been applied. Subsequently, an additional layer of a biaxially oriented polymeric material 318 has been applied, and further protective laminates 320 have been applied as an overlay on each side of the article.

Since the diffractive optical microstructure 312 is formed prior to the application of further layers, the supporting layer 316 may be formed from stiffer materials that are more suitable for forming identity cards, credit cards or the like, but which are not transparent to the wavelength of laser light used to ablate the selected portions of the opacifying layer 302. For example, supporting layer 316 may be a polyethylene/polyester coextrusion, which is not transparent to light having a wavelength of 248 nm. It will, of course, be appreciated that all of the layers of the completed article must be transparent to visible light to enable the diffractive structure 312 to project a visible image onto a suitable viewing surface by passing visible light through the ablated portions.

It will be appreciated that a security document or other article made in accordance with a preferred embodiment of the invention has the advantages of being difficult to falsify, and being resistant to attempts to tamper with the diffractive optical structure formed therein. For example, any attempt to fraudulently alter the diffractive structure will typically result in the destruction of, or damage to, the structure.

It will also be appreciated that various modifications and/or alterations that would be apparent to a person of skill in the art may be made without departing from the scope of the invention. For example, while the method has been described in preferred embodiments as involving the application of laser radiation directed onto an opacifying layer from the side of a transparent substrate opposed to the side upon which the opacifying layer is applied, it will be appreciated that a diffractive optical microstructure may be formed by directing laser radiation onto selected portions of the opacifying layer directly, without passing through the transparent substrate.

The invention claimed is:

1. A method of producing a security document or article including a substrate transparent to at least visible light and a transmissive diffractive optical microstructure, including the steps of:
   applying an opacifying layer to at least one surface of the transparent substrate;
   exposing an area of the opacifying layer to laser radiation to ablate apertures in selected portions of the opacifying layer and thereby to form a transmissive diffractive optical microstructure on said surface of the substrate,
   wherein the transmissive diffractive optical microstructure is formed such that visible light emitted from a source on one side of the opacifying layer will pass through the apertures and create a diffraction pattern which generates an image in a plane located on the side of the opacifying layer opposed to the light source.

2. A method according to claim 1 wherein laser ablation of the opacifying layer fauns a diffractive microstructure encoded with complex data, and the resulting diffractive optical microstructure is a numerical-type diffractive optical element.

3. A method according to either claim 1 wherein the step of exposing the opacifying layer to laser radiation includes irradiating the opacifying layer with a patterned laser beam bearing a pattern corresponding with the diffractive optical microstructure.

4. A method according to claim 1 wherein the step of exposing the opacifying layer to laser radiation includes irradiating the opacifying layer with a laser beam through a mask, the mask having apertures formed therein such that the laser radiation passes through said apertures in the mask to form a patterned laser beam bearing a pattern corresponding with the diffractive optical microstructure.

5. A method according to claim 4 wherein the mask is encoded with complex data required to form a numerical-type diffractive optical element.

6. A method according to claim 1 wherein the diffractive optical microstructure is formed such that the image is individual to, or distinctive of, a producer or issuer of the security document.

7. A method according to either claim 1 wherein the step of exposing an area of the opacifying layer to laser radiation includes using a scribe laser to direct a laser beam onto the selected portions of the opacifying layer to form apertures in said portions by ablation.

8. A method according to claim 1 wherein the diffractive optical microstructure is formed such that the image is generated which, is unique to a particular individual.

9. A method according to claim 8 wherein the image which is unique to a particular individual is a biometric image.

10. A method according to claim 9 wherein the biometric image is a fingerprint.

11. A method according to claim 8 wherein the image which is unique to a particular individual is a photographic image of said individual.

12. A method according to claim 1 wherein the substrate is formed of at least one transparent plastics material.

13. A method according to claim 12 wherein the at least one transparent plastics material is a laminate of two or more layers of transparent polymeric film.

14. A method according to claim 1 wherein the opacifying layer is a coloured or pigmented layer including one or more opacifying inks.

15. A method according to claim 1 wherein the opacifying layer is a stronger absorber of said laser radiation than the substrate.

16. A method according to claim 1 wherein the laser radiation has a wavelength which is selected such that that when the security document or article is exposed to the laser radiation, the selected portions of the opacifying layer absorbs the radiation and are ablated from the substrate, and wherein the substrate is substantially transparent to the radiation at said wavelength.

17. A method according to claim 1 wherein the wavelength of the laser radiation is approximately 248 nm.

18. A method according to claim 1 wherein the substrate is formed of biaxially-oriented polypropylene (BOPP).

19. A method according to claim 1 wherein the step of exposing includes directing laser radiation onto the opacifying layer from the side of the substrate opposed to the side upon which the opacifying layer is applied, such that the laser radiation passes through the substrate and ablates the selected portion of the opacifying layer.

20. A method according to claim 1 including the further step of, after forming the diffractive optical microstructure, applying one or more additional layers to the transparent substrate to produce a finished security document or article.

21. A method according to claim 20 wherein said one or more additional layers include a clear protective varnish that covers at least the diffractive optical microstructure.

22. A method according to claim 20 wherein said one or more additional layers includes clear laminating layers applied to one or both sides of the substrate.

23. A security document or article which includes:
   a substrate transparent at least to visible light;
   a transmissive diffractive optical microstructure formed in an opacifying layer applied to at least one surface of the substrate by ablating apertures in selected portions of the opacifying layer by exposure to laser radiation,
   wherein the transmissive diffractive optical microstructure is formed such that visible light emitted from a source on one side of the opacifying layer will pass through the apertures and create a diffraction pattern which generates an image in a plane located on the side of the opacifying layer opposed to the light source.

24. A security document or article according to claim 23 wherein the diffractive optical microstructure is encoded with complex data, so as to form a numerical-type diffractive optical element.

25. A security document or article according to claim 23 wherein the transmissive diffractive optical microstructure is formed such that when the image is individual to, or distinctive of a producer or issuer of the document or article.

26. A security document or article according to claim 23 wherein the transmissive diffractive optical microstructure is formed such that the image is unique to a particular individual.

27. A security document or article according to claim 26 wherein said image which is unique to a particular individual is a biometric image.

28. A security document or article according to claim 27 wherein the biometric image is a fingerprint.

29. A security document or article according to claim 26 wherein said image which is unique to a particular individual is a photographic image of the individual.

30. A security document or article according to claim 23 wherein the substrate is formed of at least one transparent plastics material.

31. A security document or article according to claim 23 wherein the substrate includes a laminate of two or more layers of transparent polymeric film.

32. A security document or article according to claim 23 wherein the opacifying layer is a coloured or pigmented layer including one or more opacifying inks.

33. A security document or article according to claim 23 wherein the opacifying layer is a stronger absorber of said laser radiation than the substrate.

34. A security document or article according to claim 23 including one or more additional layers applied over the opacifying layer and/or the substrate.

35. A security document or article according to claim 34 wherein said one or more additional layers includes a clear protective varnish covering at least the diffractive optical microstructure.

36. A security document or article according to claim 34 wherein said one or more additional layers includes clear laminating layers applied to one or both sides of the substrate.

37. A method of producing a security document or article including a substrate transparent at least to visible light and a transmissive diffractive optical microstructure, including the steps of:
  applying an opacifying layer to a surface on one side of the substrate; and
  directing laser radiation onto said opacifying layer from the opposite side of the substrate,
  wherein the substrate is substantially transparent to the laser radiation so that the laser radiation travels through the substrate without substantially affecting the substrate and selected portions of the opacifying layer are ablated by the laser radiation to form a transmissive diffractive optical microstructure in the opacifying layer,
  wherein the transmissive diffractive optical microstructure is formed such that visible light emitted from a source on one side of the opacifying layer will pass through the apertures and create a diffraction pattern which generates an image in a plane located on the side of the opacifying layer opposed to the light source.

38. A method according to claim 37 wherein the laser ablation of the opacifying layer from the opposite side of the substrate forms a diffractive microstructure encoded with complex data, and the resulting diffractive optical microstructure is a numerical-type diffractive optical element.

39. A method according to claim 37 wherein the laser radiation includes a patterned laser beam bearing a pattern corresponding with the diffractive optical microstructure.

40. A method according to claim 37 wherein the laser radiation is directed onto the opacifying layer through a mask which has apertures formed therein such that the laser radiation passes through said apertures to form a patterned laser beam bearing a pattern corresponding with the diffractive optical microstructure.

41. A method according to claim 40 wherein the mask is encoded with complex data required to form a numerical-type diffractive optical element.

42. A method according to claim 37 wherein laser radiation is directed onto the opacifying layer using a scribe laser, which forms apertures in the selected portions of the opacifying layer by ablation.

43. A method according to claim 37 including the further step of, after forming the diffractive optical microstructure, applying one or more additional layers to the transparent substrate to produce a finished security document or article.

44. A method according to claim 43 wherein said one or more additional layers includes a clear protective varnish covering at least the diffractive optical microstructure.

45. A method according to claim 43 wherein said one or more additional layers includes clear laminating layers applied to one or both sides of the substrate.

* * * * *